April 18, 1967   J. A. KOPFLE   3,314,533
LENS CONTAINING AND DISPENSING DEVICE
Filed Nov. 15, 1965
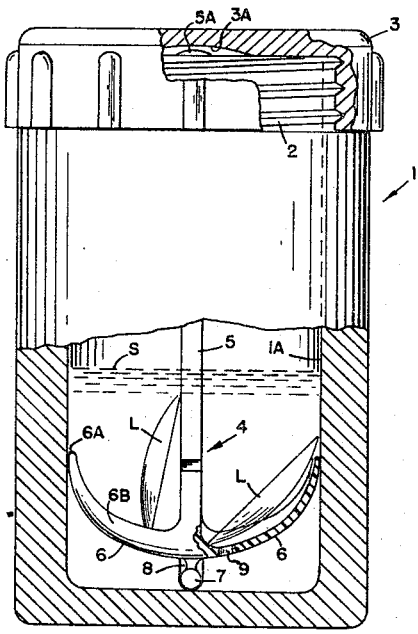
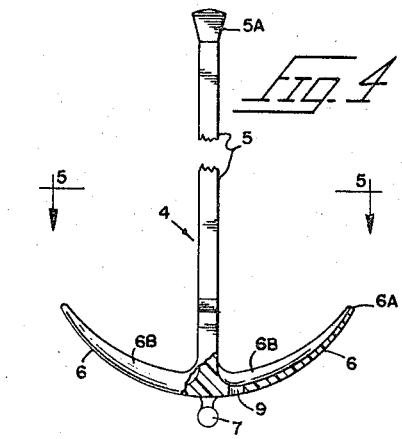
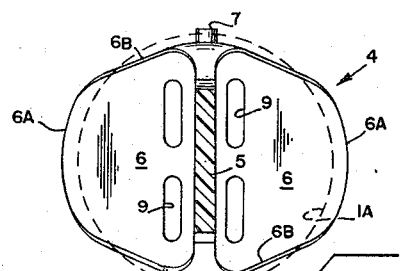
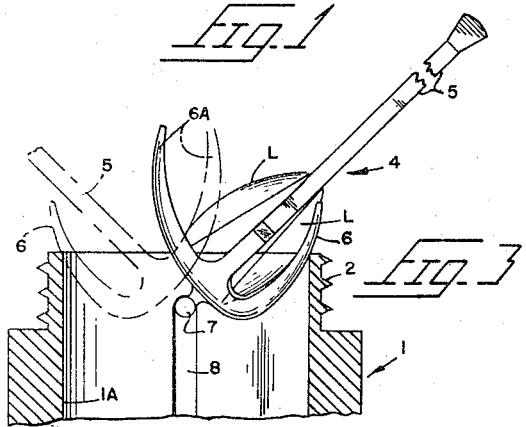
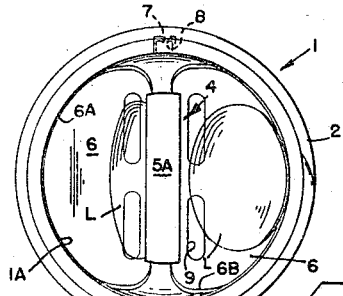
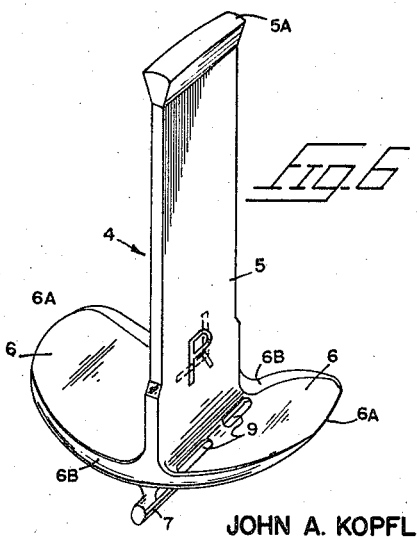
JOHN A. KOPFLE
INVENTOR.
BY *James D. Givnan Jr.*
AGENT

United States Patent Office 3,314,533
Patented Apr. 18, 1967

3,314,533
LENS CONTAINING AND DISPENSING DEVICE
John Arnold Kopfle, 5530 SE. Tolman St.,
Portland, Oreg. 97206
Filed Nov. 15, 1965, Ser. No. 507,746
1 Claim. (Cl. 206—56)

This invention relates to containers for the storage of lenses of the type fitted to the cornea of the eyeball and commonly known as corneal contact lenses.

An important object of this invention is the provision of a lens carrier within the container for positioning the lenses to facilitate deposit and withdrawal thereof by the wearer. By reason of the size and transparent nature of contact lenses a considerable problem arises in their transfer from an operative position on the eye to a storage receptacle and vice versa. The wearer is handicapped to some extent by the fact that, obviously, he must perform this operation with somewhat less than perfect vision. The instant device allows the presentation of the minute lens in a manner conducive to easy grasping by the wearer's fingers. Additionally, facilitating this operation is the provision of indicia on the lens carrier to indicate storage areas for the right eye lens and left eye lens.

A further object is the provision of a lens container having a lens carrier of a unitary nature formed from a flexible plastic material and particularly adapted for economical production methods. The lens carrier includes guide followers slidable in channels lengthwise of the walls of the container to limit the carrier's upward travel therein and also to serve as a fulcrum about which the carrier stem may be tilted to either side to expose a lens on the opposite side for convenient removal. This limited operative range of the carrier within the container prevents its accidental or unintentional removal and resultant fall out of the lenses.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of the container with fragments removed for illustrative purposes.

FIGURE 2 is a plan view of the container of FIGURE 1 with the top thereof removed.

FIGURE 3 is a fragmentary, enlarged view of the container with the lens carrier raised into a lens receiving or discharging position.

FIGURE 4 is a fragmentary, side elevational view of the lens carrier.

FIGURE 5 is a horizontal, sectional view of the carrier taken along line 5—5 of FIGURE 4.

FIGURE 6 is a perspective of the lens carrier.

With continuing regard to the drawings and particularly FIGURE 1, indicated generally at 1 is a receptacle in the form of a cylindrical container having an elongated opening therein terminating in a threaded portion 2 at its upper end for the reception of a cap 3 provided with internal, matching threads. A lens carrier, indicated generally at 4 extends substantially the length of the container 1 and in its lowermost position (as shown) supports a pair of lenses L in submersion within a sanitary solution.

The lens carrier 4 is of unitary construction and comprises an upright stem portion 5, as best illustrated in FIGURES 4–6. Oppositely disposed on either side of the stem 5 at the lower end thereof, are a pair of outwardly directed shelves 6 for the reception of lenses L. Guide followers are formed integral with the bottom end of the stem and comprise lateral extensions 7 slidably engageable with diametrically opposed channels or guideways 8 formed in the inner wall 1A of container 1.

As best shown in FIGURES 4 and 6, both shelves 6 are normally of arcuate formation in side elevation and taper radially from their juncture with the bottom end of the stem 5 to a lip 6A. Such formation facilitates upward flexing of the shelves for positioning within the container 1 as shown in FIGURE 1 and further upward flexing as shown in FIGURE 3 at the top end of the container to expose either lens L for convenient removal by the user. Adjacent the juncture of each shelf 6 and the stem 5, a pair of openings 9 are formed for the passage of the sanitary solution S upon the raising or lowering of the lens carrier. The flexible character of the material from which the lens carrier is constructed permits the upward flexing of each shelf 6 into the position shown in FIGURE 1 as the carrier is inserted, during assembly, into the container. The inner wall 1A of the container is indicated in broken lines in FIGURE 5 and is of slightly less diameter than the radial extent of lip portions 6A of the shelves. Sidewalls 6B are formed on the side edges of the shelves 6 for retention of the lenses L when the lens carrier is in the raised position.

Stem 5 terminates at its upper end in a finger-grip 5A which may extend upwardly from the container's mouth into a concave recess 3A in the cap 3. Suitable indicia may be carried by each side of the lens carrier, such as for instance, the letters R and L or alternatively the color of red may be displayed on one side of the stem 5 and fingergrip 5A to indicate the side receiving the lens for the right eye, while the opposite side may be of the color of yellow.

In the assembly of the present invention where a semi-rigid material has been used for the cylindrical container 1, slight out-of-round distortion of the container will enable the guide means 7 to pass through the mouth thereof.

In operation the lenses L are placed upon their respective shelves 6 of the lens carrier 4 with the latter in the raised and inclined positions as shown in solid and broken lines of FIGURE 3. As aforesaid, the minute nature of the contact lens results in the task of removing of the lens from the eye and inserting it within a small receptacle being somewhat critical. In the present invention this task is greatly simplified by the elongated, tilted stem 5 on which the lens may be initially placed. Since obviously the eyes of the user are unaided at this point by the lens it is of importance to provide a receiving surface of considerable size in relation to the lens.

Limit stop means are provided by the upper terminus of guideways 8 to prevent inadvertent extraction of the lens carrier 4 from container 1. The projections 7 function additionally as hinge pins for the arcuate travel of the carrier 4 when in its raised position. Upon such travel, one of the shelves 6 and a lens L, if positioned thereon, is necessarily displaced centrally toward the stem 5 by a portion of the container's rim.

While I have shown one form of the invention, it is apparent that minor changes therein will readily suggest themselves to those skilled in the art without departing from the spirit and scope of the present invention as hereinafter claimed.

I claim:
A lens container of hollow cylindrical form open at one of its ends and having vertical guideways formed lengthwise of the inner walls thereof,
removable closure means for said open end,
a lens carrier disposed within said container and in- cluding a stem providing a fingergrip to permit manual outward movement of said carrier relative to the container, said carrier further including a pair of upwardly turned laterally extending flexible shelves, and means carried by the carrier subjacent said shelves and slidable within said guideways whereby said means will limit the upward travel of said lens carrier.

References Cited by the Examiner

UNITED STATES PATENTS 522,693 7/1894 McLaughlin.
2,944,661 7/1960 Goldstein.

THERON E. CONDON, *Primary Examiner.*

J. M. CASKIE, *Assistant Examiner.*